United States Patent [19]

Heibel

[11] Patent Number: 4,852,700
[45] Date of Patent: Aug. 1, 1989

[54] SPOT-TYPE DISK BRAKE

[75] Inventor: Helmut Heibel, Moschheim, Fed. Rep. of Germany

[73] Assignee: Lucas Industries public limited company, Birmingham, England

[21] Appl. No.: 222,912

[22] PCT Filed: Dec. 4, 1987

[86] PCT No.: PCT/EP87/00755
§ 371 Date: May 31, 1988
§ 102(e) Date: May 31, 1988

[87] PCT Pub. No.: WO88/04375
PCT Pub. Date: Jun. 16, 1988

[30] Foreign Application Priority Data

Dec. 5, 1986 [DE] Fed. Rep. of Germany ....... 8632646
Dec. 9, 1986 [DE] Fed. Rep. of Germany ....... 8632995

[51] Int. Cl.⁴ .............................................. F16D 65/14
[52] U.S. Cl. .............................. 188/73.43; 188/264 G; 192/113 A; 411/87; 411/90; 411/969
[58] Field of Search ............. 188/264 G, 73.31, 73.42, 188/73.43, 73.39; 192/113 A; 411/87, 90, 95, 966, 969

[56] References Cited

U.S. PATENT DOCUMENTS 3,166,159  1/1965  Burnett .............................. 188/73.42
4,572,336  2/1986  Smith ........................... 188/264 G X
4,775,033 10/1988  Heibel ............................... 188/73.43

FOREIGN PATENT DOCUMENTS 1059722  6/1959  Fed. Rep. of Germany ........ 411/90
8601094  3/1986  Fed. Rep. of Germany ... 188/264 G
942325 11/1963  United Kingdom ................. 411/90

Primary Examiner—George E. A. Halvosa
Attorney, Agent, or Firm—Scrivener and Clarke

[57] ABSTRACT

On a brake support (12) engaging over a brake disk (10) a piston (34) is supported and on the other side a floating caliper (14) is supported for axial displacement. In both cases slide guides (40) are provided for the supporting and each have a guide body (42) having a groove (46) parallel to the axis (A) of the brake disk (10) and a threaded pin (48) which extends transversely of the axial center plane (B) of the brake and engages into the associated groove (46). The slide guides (40) are surrounded in each case by a resilient sealing sleeve (54) which is protected by a heat shield (66) arranged between it and the brake disk (10). Associated with the threaded pins (48) are anti-rotation locks for securing the pins against turning and which comprise mounting members (56) secured to the brake support (12). The mounting members (56) carry at the same time the heat shields (66).

6 Claims, 1 Drawing Sheet

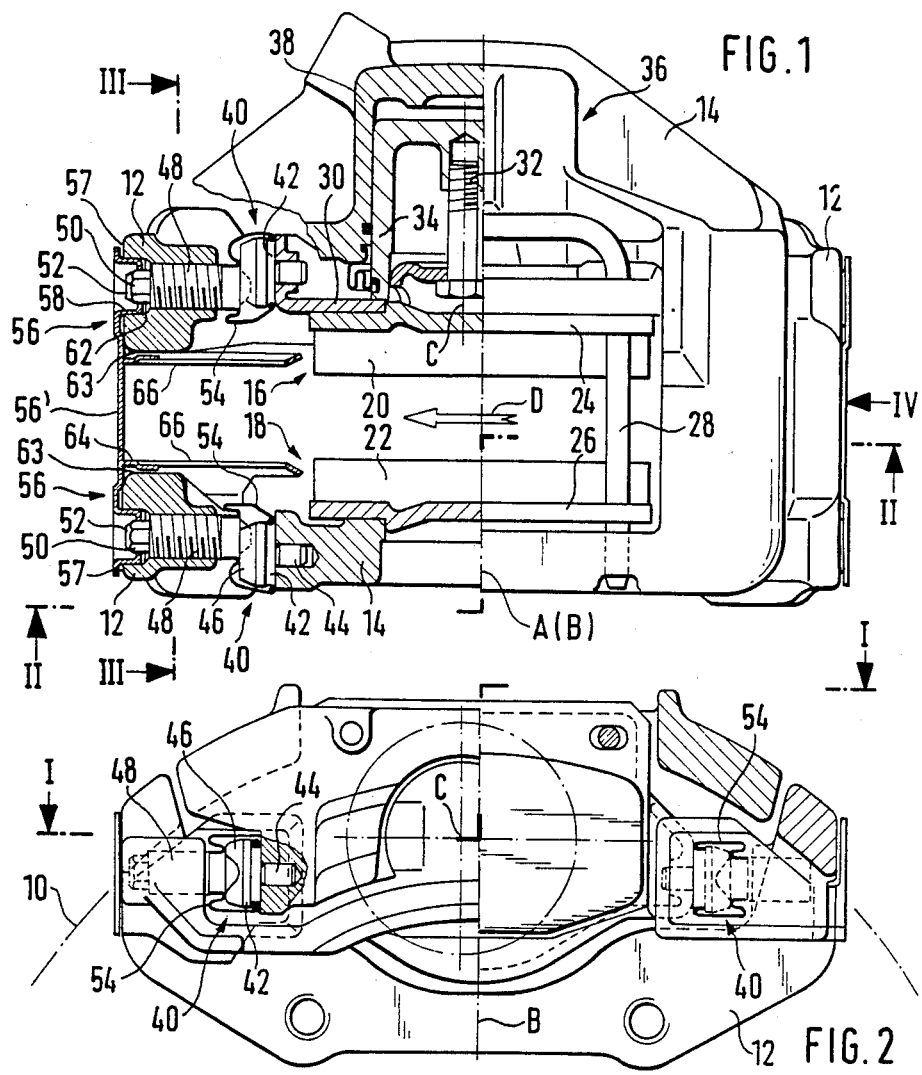
FIG.1
FIG.2
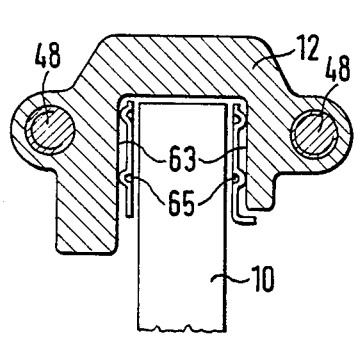
FIG.3
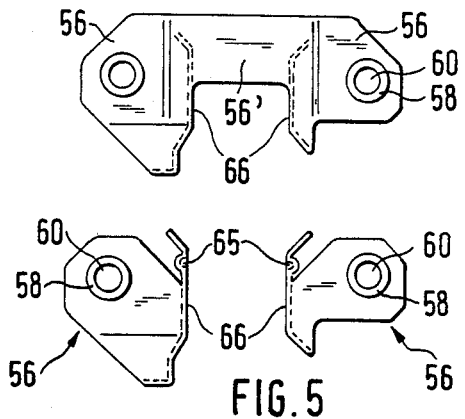
FIG.4
FIG.5

SPOT-TYPE DISK BRAKE

The invention relates to a spot-type disk brake comprising
- a brake support which engages over a brake disk,
- a floating caliper which on a first side of the brake disk comprises an actuator with a piston,
- a first brake pad which is arranged on the first side of the brake disk and actuable by the piston,
- a second brake pad which is arranged on the second side of the brake disk and is actuable by displacement of the floating caliper, and
- slide guides for supporting the piston on the brake support on the first side of the brake disk and for supporting the floating caliper on the brake support on the second side of the brake disk, the slide guides being formed in each case by
- a guide body comprising a groove at least approximately parallel to the axis of the brake disk,
- a threaded pin which extends transversely of the axial centre plane of the brake and engages into the groove and
- a sealing sleeve which protects the parts of the guide body and threaded pin co-operating with each other from soiling and is protected by a heat shield arranged between it and the brake disk.

In disk brakes of this type the guide bodies may be arranged either on the floating caliper or on the brake support. Accordingly the threaded pins are screwed into the brake support or the caliper In both cases the threaded pins are screwed in to such an extent that together with the associated guide body they provide an almost play-free slide guide. In this screwed-in position the threaded pins must be secured so that they do not unintentionally become loose due to vibrations.

To set the necessary guide play and the exact movement direction of the floating caliper with respect to the brake support both these components are held in a desired position by clamping means. The threaded pins are then mechanically screwed in until the screw-in torque required for this purpose exceeds a predetermined value which shows that the guide is free of play. Finally, the threaded pins are turned back a predetermined angular amount to give the desired small guide play.

In a known disk brake of the aforementioned type (DE-GM No. 8,601,094) the threaded pins are secured directly at their threads. For this purpose generally chemical substances are used which are applied in microcapsules to the threads. On assembly the microcapsules are squashed so that the chemical substances can react, the inner and outer threads thereby being stuck to each other.

It has been found that in the known disk brake according to the preamble the friction between the threaded pins and the threaded bores receiving them fluctuates during the squashing of the microcapsules to such an extent that it is not possible to adjust the guide play with the desired accuracy with the aid of the screw-in torque.

In the known brake according to the preamble the heat shields are each secured to a collar which is secured around the associated guide body on the floating caliper. This type of mounting requires an additional assembly expenditure for each of the heating shields.

The invention is therefore based on the problem of reducing the assembly expenditure involved with the securing of the threaded pins and attachment of the heat shields.

The problem is solved according to the invention in a spot-type disk brake of the type described at the beginning in that
- there is associated with at least one of the threaded, pins a an anti-rotation lock which comprises a mounting member secured to the brake support and cooperating with the pin to prevent accidental rotation thereof, and
- that the heat shield provided for protecting the sealing sleeve of said threaded pin is carried by the mounting member.

The use of anti-rotation locks reliably secures the threaded pins against rotation. Each mounting member is at the same time a supporting component for the associated heat shield which is either secured as separate component to the mounting member, for example fixedly welded, or is made in one piece with the mounting member, for example by deep drawing. In both cases by securing a mounting member on the associated threaded pin and on the brake support the associated heat shield can be brought into position without any further assembly work.

In a preferred embodiment of the invention the mounting member comprises a recess which is fitted onto a polygonal head of the associated threaded pin and is thereby deformed complementarily to the polygonal head. The recess may be formed in a pot-shaped depression of the mounting member which is pressed into a widening of a threaded bore receiving the associated threaded pin.

Preferably the or each mounting member is angled and bears on an end face and a side face of the brake support facing the brake disk.

The spot-type disk brake according to the invention can also be further developed in that a common anti-rotation lock is associated with two threaded pins on either side of the brake disk and comprises a pair of mounting members engaging over the brake disk in bridge manner. The use of a common anti-rotation lock for two threaded pins arranged on either side of the brake disk secures said pins particularly reliably against turning because they have axes which do not coincide and are thus not jointly rotatable with the bridge-like pair of mounting members. By securing a common pair of mounting members to two threaded pins arranged on either side of the brake disk the two associated heat shields are also brought into position easily without further assembly work.

As in the disk brake known from DE-GM No. 8,601,094 on each side of the brake disk two slide guides for the piston and for the floating caliper respectively are provided. In this case the invention can be further developed in that all the slide guides each have a threaded pin and that two pairs of mounting members are provided, each pair connecting together a pair of threaded pins and carrying a pair of heat shields.

Examples of embodiment of the invention will be explained hereinafter with the aid of the schematic drawings, wherein:

FIG. 1 is a plan view of a spot-type disk brake shown partially as section in the plane I—I of FIG. 2, FIG. 2 is an end view of the disk brake shown partially in section in the plane II—II in FIG. 1, FIG. 3 is the section III—III of FIG. 1, FIG. 4 is a detail in side view according to the arrow IV of FIG. 1 and FIG. 5 is a variant of FIG. 4.

A brake support 12 mounted on a vehicle and a floating caliper 14 displaceable parallel to the axis A of the brake disk 10 engage over the outer edge of said brake disk 10, only indicated in the drawing. Two brake pads 16 and 18 arranged on either side of the brake disk 10 each have a brake lining 20 and 22 respectively and a support plate 24 and 26 respectively. Extending through the support plates 24 and 26 is a U-shaped retaining stirrup member 28 which is secured to the floating caliper 14.

The brake pad 16 is supported with its support plate 24 on a piston carriage 30 which by means of a screw 32 is secured to a piston 34 of a hydraulic actuator 36. The actuator 36 comprises a cylinder 38 which is formed integrally with the floating caliper 14 and extends parallel to the axis A of the brake disk 10. The second brake pad 18 is supported with its support plate 26 on the other side of the brake disk 10 directly on the floating caliper 14.

The piston carriage 30 is guided by means of two slide guides 40 on the brake support 12. The two slide guides 40, as apparent in particular from FIG. 2, are arranged symmetrically with respect to a centre plane B of the disk brake which contains the axis A of rotation of the brake disk 10; the axis C of the actuator 36 is slightly forwardly offset with respect to the centre plane B in the main direction of rotation D of the brake disk 10. The main direction of rotation D is the direction in which the brake disk 10 rotates when the vehicle to be retarded is travelling forwards.

Each of the slide guides 40 has a guide body 42 which is secured on the piston carriage 30 by means of a stud 44 disposed at right-angles to the centre plane B and comprises a groove 46 parallel to the axis A. A threaded pin 48 with a conical end formed thereon engages into the groove 46. The threaded pin 48 is screwed into the brake support 12 at right-angles to the centre plane and has a hexagonal head 50 having a conical centering shoulder 52. The guide body 42 and the end of the threaded pin 48 co-operating therewith are sealingly enclosed by a sleeve 54 of rubber or similar resilient material and thereby protected from soiling and dirt.

Two further slide guides 40 which correspond to those described and are therefore provided with the same reference numerals guide the floating caliper 14 on the brake support 12 on the side of the brake disk 10 remote from the actuator 36 in the same manner as the piston carriage 30 is guided on the brake support 12 on the first side of the brake disk 10. Thus, a pair of slide guides 40 is arranged on either side of the centre plane B of the disk brake.

In accordance with FIGS. 1 to 4 a common anti-rotation lock is associated with each pair of slide guides 40 and comprises a bridge-like pair of mounting members 56 pressed from sheet metal. Each pair of mounting members 56 comprises a centrepiece 56' which bridges the brake disk 10, bears on either side thereof on an end face 57 of the brake support 12 and comprises therein in each case a pot-shaped depression 58. The two pot-shaped depressions 58 of each pair of mounting members 56 are pressed onto the hexagonal head 50 of one of the threaded pins 48 and for this purpose comprise a recess 60 which is circular in the unused state and the diameter of which corresponds to the key width of the hexagonal head. When pressed on to the hexagonal head 50 the edges of the latter penetrate the edge of the recess 60, the respective threaded pin 48 thereby being locked against rotation. The pressing on of the depression 58 onto the associated hexagonal head 50 is facilitated by the conical centering shoulder 52 of the latter.

Each of the securing members 56 is secured against unintentional withdrawal in the direction away from the centre plane B in that each of the pot-shaped depressions 58 is received with interference fit in a widening 62 of the threaded bore into which the associated threaded pin 48 is screwed.

Each mounting member 56 bears additionally on a side face 63 of the brake support 12 parallel to the brake disk 10 and for this purpose comprises a tab 64 which extends parallel to the brake disk 10 and on which are embossed warts 65 directed away from the brake disk 10 Integrally formed with the tab 64 and thus with the mounting member 56 as a whole is a heat shield 66. The heat shield 66 is stiffened by beading or edging and extends in the direction towards the centre plane of the disk brake 10 to such an extent that it shields one of the sleeves 54 from the radiant heat emanating from the brake disk 10.

The variant according to FIG. 5 differs from the embodiment illustrated in FIGS. 1 to 4 in that each mounting member 56 is an independent component, i.e. is not connected to the mounting member opposite it by a bridge 56'.

I claim:

1. Spot-type disk brake comprising
   a brake support (12) which engages over a brake disk (10),
   a floating caliper (14) which on a first side of the brake disk (10) comprises an actuator (36) with a piston (34),
   a first brake pad (16) which is arranged on the first side of the brake disk (10) and actuable by the piston (34),
   a second brake pad (18) which is arranged on the second side of the brake disk (10) and is actuable by displacement of the floating caliper (14), and
   slide guides (40) for supporting the piston (34) on the brake support (12) on the first side of the brake disk (10) and for supporting the floating caliper (14) on the brake support (12) on the second side of the brake disk (10), the slide guides (40) being formed in each case by
   a guide body (42) comprising a groove (46) at least approximately parallel to the axis (A) of the brake disk (10),
   a threaded pin (48) which extends transversely of the axial centre plane (B) of the brake and engages into the groove (46) and
   a sealing sleeve (54) which protects the parts of the guide body (42) and threaded pin (48) co-operating with each other from soiling and is protected by a heat shield (66) arranged between it and the brake disk (10), characterized in that
   there is associated with at least one of the threaded pins (48) an anti-rotation lock securing the pin against turning and which comprises a mounting member (56) secured to the brake support (12), and
   the heat shield (66) provided for protecting the sealing sleeve (54) of said threaded pin (48) is carried by the mounting member (56).

2. Spot-type disk brake according to claim 1, characterized in that the mounting member (56) comprises a recess (60) which is fitted onto a polygonal head (50) of the associated threaded pin (48) and is thereby deformed complementarily to the polygonal head (50).

3. Spot-type disk brake according to claim 2, characterized in that the recess (60) is formed in a pot-shaped depression (58) of the mounting member (56) which is pressed into a widening (62) of a threaded bore receiving the associated threaded pin (48).

4. Spot-type disk brake according to claim 1, characterized in that the mounting member (56) is angled and bears on an end face (57) and on a side face (63) of the brake support (12) facing the brake disk (10).

5. Spot-type disk brake according to any one of claims 1 to 4, characterized in that a common anti-rotation lock is associated with two threaded pins (48) on either side of the brake disk (10) and comprises a pair of mounting members (56) engaging over the brake disk (10) in bridge-like manner.

6. Spot-type disk brake according to claim 5 in which on each side of the brake disk (10) two slide guides (40) are arranged for the piston (34) and the floating caliper (14) respectively, characterized in that all the slide guides (40) each have a threaded pin (48) and that two pairs of mounting members (56) are provided, of which each pair connects a pair of threaded pins (48) together and carries a pair of heat shields (66).

* * * * *